US009218683B2

(12) United States Patent
Lau et al.

(10) Patent No.: US 9,218,683 B2
(45) Date of Patent: Dec. 22, 2015

(54) COLLECTION REARRANGEMENT ANIMATION

(75) Inventors: Bonny P. Lau, Bellevue, WA (US); Maverick J. Velasco, Sammamish, WA (US); Jan-Kristian Markiewicz, Redmond, WA (US); Jonathan Eric Gleasman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 726 days.

(21) Appl. No.: 13/118,059

(22) Filed: May 27, 2011

(65) Prior Publication Data
US 2012/0299933 A1 Nov. 29, 2012

(51) Int. Cl.
*G06T 13/00* (2011.01)
*G06T 13/40* (2011.01)
*G06T 13/80* (2011.01)

(52) U.S. Cl.
CPC ............... *G06T 13/40* (2013.01); *G06T 13/00* (2013.01); *G06T 13/80* (2013.01)

(58) Field of Classification Search
None
See application file for complete search history.

(56) References Cited

U.S. PATENT DOCUMENTS

| 6,957,389 | B2 | 10/2005 | Faraday et al. | |
|---|---|---|---|---|
| 7,262,775 | B2 | 8/2007 | Calkins et al. | |
| 7,692,658 | B2 | 4/2010 | Moore | |
| 2002/0057386 | A1* | 5/2002 | Otera | 348/744 |
| 2004/0061791 | A1* | 4/2004 | Terada | 348/231.2 |
| 2005/0046630 | A1 | 3/2005 | Jacob et al. | |
| 2007/0057951 | A1* | 3/2007 | Anthony et al. | 345/473 |
| 2007/0263729 | A1* | 11/2007 | Ju et al. | 375/240.24 |
| 2007/0270985 | A1* | 11/2007 | Shellshear | 700/87 |
| 2008/0303827 | A1 | 12/2008 | Schiff | |
| 2009/0322760 | A1* | 12/2009 | Kwiatkowski et al. | 345/473 |
| 2010/0007613 | A1* | 1/2010 | Costa | 345/173 |
| 2010/0073377 | A1* | 3/2010 | Cai et al. | 345/440 |
| 2010/0085383 | A1* | 4/2010 | Cohen et al. | 345/660 |
| 2010/0122192 | A1* | 5/2010 | Hanna | 715/765 |
| 2010/0131901 | A1* | 5/2010 | Takahashi et al. | 715/838 |
| 2010/0235769 | A1 | 9/2010 | Young et al. | |

(Continued)

OTHER PUBLICATIONS

Seybold, et al., "An Effective Layout Adaptation Technique for a Graphical Modeling Tool", Retrieved at <<http://www.ifi.uzh.ch/groups/req/ftp/papers/ICSE2003_tool_demo_paper.pdf>>, Proceedings of the 25th International Conference on Software Engineering, May 3-10, 2003, pp. 826-827.

*Primary Examiner* — Ulka Chauhan
*Assistant Examiner* — Anh-Tuan V Nguyen
(74) *Attorney, Agent, or Firm* — Bryan Webster; Kate Drakos; Micky Minhas

(57) ABSTRACT

Collection rearrangement animation techniques are described herein, which can be employed to represent changes made by a rearrangement in a manner that reduces or eliminates visual confusion. A collection of items arranged at initial positions can be displayed. Various interaction can initiate a rearrangement of the collection of items, such as to sort the items, add or remove an item, or reposition an item. An animation of the rearrangement is depicted that omits at least a portion of the spatial travel along pathways from the initial positions to destination positions in the rearranged collection. In one approach, items can be animated to disappear from the initial positions and reappear at destination positions. This can occur by applying visual transitions that are bound to dimensional footprints of the items in the collection. Additionally or alternatively, intermediate and overlapping positions can be omitted by the animation.

20 Claims, 12 Drawing Sheets

(56) References Cited

U.S. PATENT DOCUMENTS

| | | | |
|---|---|---|---|
| 2010/0241939 A1* | 9/2010 | Rozen-Atzmon | 715/202 |
| 2010/0333039 A1* | 12/2010 | Denkel | 715/854 |
| 2011/0214079 A1* | 9/2011 | Young | 715/765 |
| 2012/0131465 A1* | 5/2012 | Telek et al. | 715/733 |

* cited by examiner

COLLECTION REARRANGEMENT ANIMATION

BACKGROUND

One way that users can employ computing devices is to interact with collections of items. Collections can be displayed via a computing device to enable users to quickly view, navigate, and work with groups of related items such as a photo library, documents, tiles representing applications, icons, a media collection, and so forth. User interaction with a collection can cause a rearrangement of items within the collection that can be animated to help the user visualize changes made by the rearrangement.

One traditional animation approach involves directly showing travel of rearranged items along pathways (e.g., substantially straight lines) between starting positions and ending positions. Although this approach represents the actual physical movement of items, this kind of animation creates visual confusion as items overlap and/or slide across the collection. Moreover, a multitude of intermediate positions for each of the items must be specified to show travel along the pathways, which complicates development and presentation of rearrangements.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Collection rearrangement animation techniques are described herein, which can be employed to represent changes made by a rearrangement in a manner that reduces or eliminates visual confusion. A collection of items arranged at initial positions can be displayed. Various interactions can initiate a rearrangement of the collection of items, such as to sort the items, add or remove an item, or reposition an item. An animation of the rearrangement is depicted that omits at least a portion of the spatial travel along pathways from the initial positions to destination positions in the rearranged collection. In one approach, items can be animated to disappear from the initial positions and reappear at destination positions. This can occur by applying visual transitions that are bound to dimensional footprints of the items in the collection. Additionally or alternatively, intermediate and overlapping positions can be omitted by the animation.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditionally, animations to represent rearrangement of a collection show travel of items directly along pathways between starting positions and ending positions. This creates visual confusion as items overlap and/or slide across the collection and requires enumeration of each intermediate position for the items along the pathways, which complicates development and presentation of rearrangements.

Collection rearrangement animation techniques are described herein, which can be employed to represent changes made by a rearrangement in a manner that reduces or eliminates visual confusion. A collection of items arranged at initial positions can be displayed. Various interactions can initiate a rearrangement of the collection of items, such as to sort the items, add or remove an item, or reposition an item. An animation of the rearrangement is depicted that omits at least a portion of the spatial travel of items along pathways from the initial positions to destination positions in the rearranged collection. In one approach, items can be animated to disappear from the initial positions and reappear at destination positions. This can occur by applying visual transitions that are bound to footprints of the items in the collection. Additionally or alternatively, intermediate and overlapping positions can be omitted by the animation. In this way, the animation can be produced using the starting and ending positions of the items without having to enumerate intermediate positions.

In the discussion that follows, a section titled "Operating Environment" is provided and describes one environment in which one or more embodiments can be employed. Following this, a section titled "Collection Rearrangement Animation Techniques" describes example implementation details and methods in accordance with one or more embodiments. Last, a section titled "Example Device" describes example computing systems and devices that can be utilized to implement one or more embodiments.

Operating Environment

Figure 1:
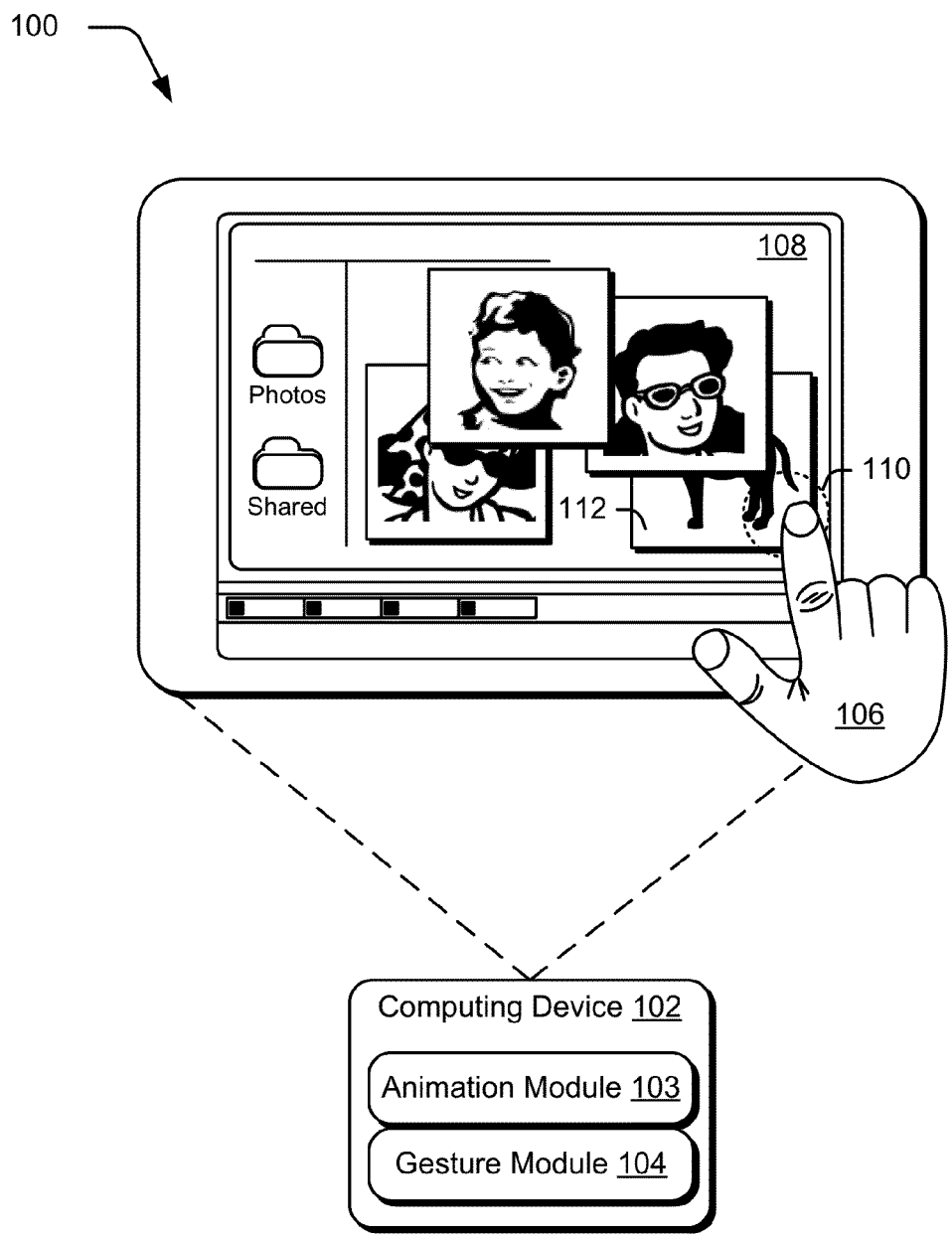
FIG. 1 is an illustration of an environment in an example implementation in accordance with one or more embodiments.

FIG. 1 is an illustration of an environment 100 in an example implementation that is operable to employ collection rearrangement animations as described herein. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 also includes software that causes the computing device 102 to perform one or more operations as described below.

Computing device 102 includes an animation module 103 that is operational to manage and provide animations as described herein. Various animations can be depicted for content that is rendered for display by the computing device. For instance, the animation module 103 is representative of functionality to render animations in connection with various user interfaces for display by the computing device. The animation module 103 controls animations for the user interfaces including collection rearrangement animations described in this document. In general, collection rearrangement animations as described herein omit at least a portion of the spatial travel of rearranged items along pathways from the initial positions to destination positions in a rearranged collection. In this way, the animation can reduce or eliminate overlap between items and associated visual confusion. Collection rearrangement animations can occur in response to various different kinds of inputs to rearrange a collection including for example keyboard inputs, mouse input, verbal commands, menu interaction and/or various gestures applied to the collection.

To facilitate gestural inputs, computing device 102 further includes a gesture module 104 that is operational to provide gesture functionality as described in this document. Gesture module 104 is representative of functionality that recognizes gestures and causes operations to be performed that correspond to the gestures. The gestures may be recognized by the gesture module 104 in a variety of different ways. For example, the gesture module 104 may be configured to recognize a touch input, such as a finger of a user's hand 106 as proximal to display device 108 of the computing device 102 using touchscreen functionality. In particular, gesture module 104 can recognize gestures to manipulate a collection of items such as content selection, drag and drop operations, insertions, sorting, and the like.

For example, a finger of the user's hand 106 is illustrated as selecting 110 an image 112 displayed by the display device 108. Selection 110 of the image 112, movement of the finger of the user's hand 106, and/or other gestures may be recognized by the gesture module 104. The gesture module 104 may identify this recognized movement, by the nature and character of the movement. A variety of different types of gestures may be recognized by the gesture module 104 including, by way of example and not limitation, gestures that are recognized from a single type of input (e.g., touch gestures such as the previously described drag-and-drop gesture) as well as gestures involving multiple types of inputs. For example, module 104 can be utilized to recognize single-finger gestures and bezel gestures, multiple-finger/same-hand gestures and bezel gestures, and/or multiple-finger/different-hand gestures and bezel gestures. Thus, recognition of touch input may be used to identify a gesture and initiate corresponding actions including collection rearrangement animations.

Gestures and/or other types of inputs (e.g., keyboard, mouse, menu selections) can be employed to initiate rearrangement of a collection of items. The input can trigger a collection rearrangement animation that can be implemented via the animation module 103. Although some of the examples that follow are described in relation to example gestural inputs, it should be clear that any suitable type of input can trigger rearrangements and corresponding animations discussed herein.

Figure 2:
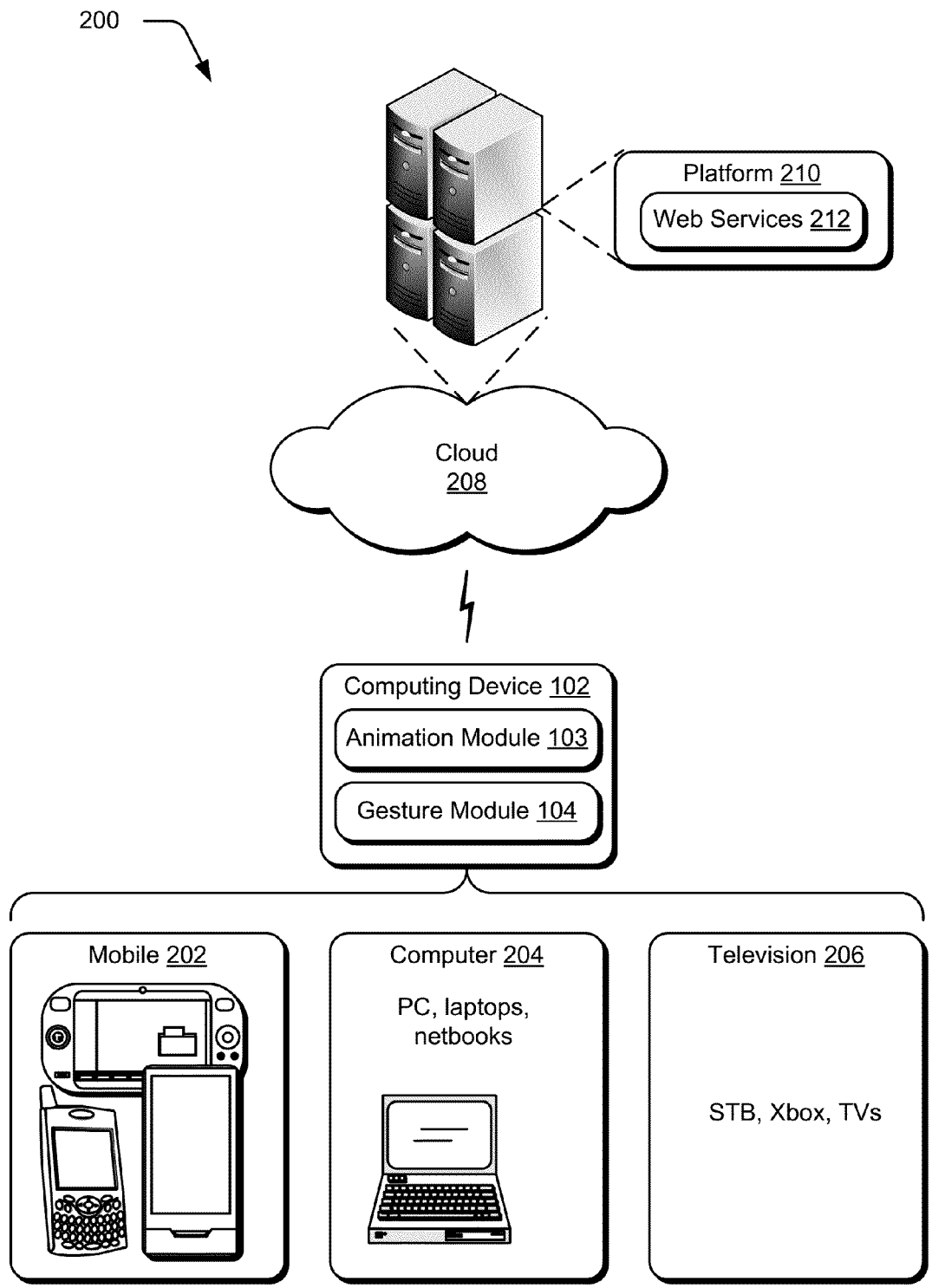
FIG. 2 is an illustration of a system in an example implementation showing the computing device of FIG. 1 in greater detail.

FIG. 2 illustrates an example system showing the computing device 102 as being implemented in an environment where multiple devices are interconnected through a central computing device. The central computing device may be local to the multiple devices or may be located remotely from the multiple devices. In one embodiment, the central computing device is a "cloud" server farm, which comprises one or more server computers that are connected to the multiple devices through a network or the Internet or other means.

In one embodiment, this interconnection architecture enables functionality to be delivered across multiple devices to provide a common and seamless experience to the user of the multiple devices. Each of the multiple devices may have different physical requirements and capabilities, and the central computing device uses a platform to enable the delivery of an experience to the device that is both tailored to the device and yet common to all devices. In one embodiment, a "class" of target device is created and experiences are tailored to the generic class of devices. A class of device may be defined by physical features or usage or other common characteristics of the devices. For example, as previously described the computing device 102 may be configured in a variety of different ways, such as for mobile 202, computer 204, and television 206 uses. Each of these configurations has a generally corresponding screen size and thus the computing device 102 may be configured as one of these device classes in this example system 200. For instance, the computing device 102 may assume the mobile 202 class of device which includes mobile telephones, music players, game devices, and so on. The computing device 102 may also assume a computer 204 class of device that includes personal computers, laptop computers, netbooks, and so on. The television 206 configuration includes configurations of devices that involve display in a casual environment, e.g., televisions, set-top boxes, game consoles, and so on. Thus, the techniques described herein may be supported by these various configurations of the computing device 102 and are not limited to the specific examples described in the following sections.

Cloud 208 is illustrated as including a platform 210 for web services 212. The platform 210 abstracts underlying functionality of hardware (e.g., servers) and software resources of the cloud 208 and thus may act as a "cloud operating system." For example, the platform 210 may abstract resources to connect the computing device 102 with other computing devices. The platform 210 may also serve to abstract scaling of resources to provide a corresponding level of scale to encountered demand for the web services 212 that are implemented via the platform 210. A variety of other examples are also contemplated, such as load balancing of servers in a server farm, protection against malicious parties (e.g., spam, viruses, and other malware), and so on. Thus, the cloud 208 is included as a part of the strategy that pertains to software and hardware resources that are made available to the computing device 102 via the Internet or other networks.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code and/or instructions that perform specified tasks when executed on or by a processor (e.g., CPU or CPUs). The program code and/or instructions can be stored in one or more computer-readable media or other suitable memory devices. The features of the animation techniques described below are platform-independent, meaning that the techniques may be implemented on a variety of commercial computing platforms having a variety of processors.

Collection Rearrangement Animation Techniques

In one or more embodiments, a collection rearrangement animation can be triggered in response to various inputs to visually represent a rearrangement of a collection of items. In accordance with techniques described above and below, the animation is designed to reduce or visually mitigate overlap of items and reduce visual confusion.

Figure 3:
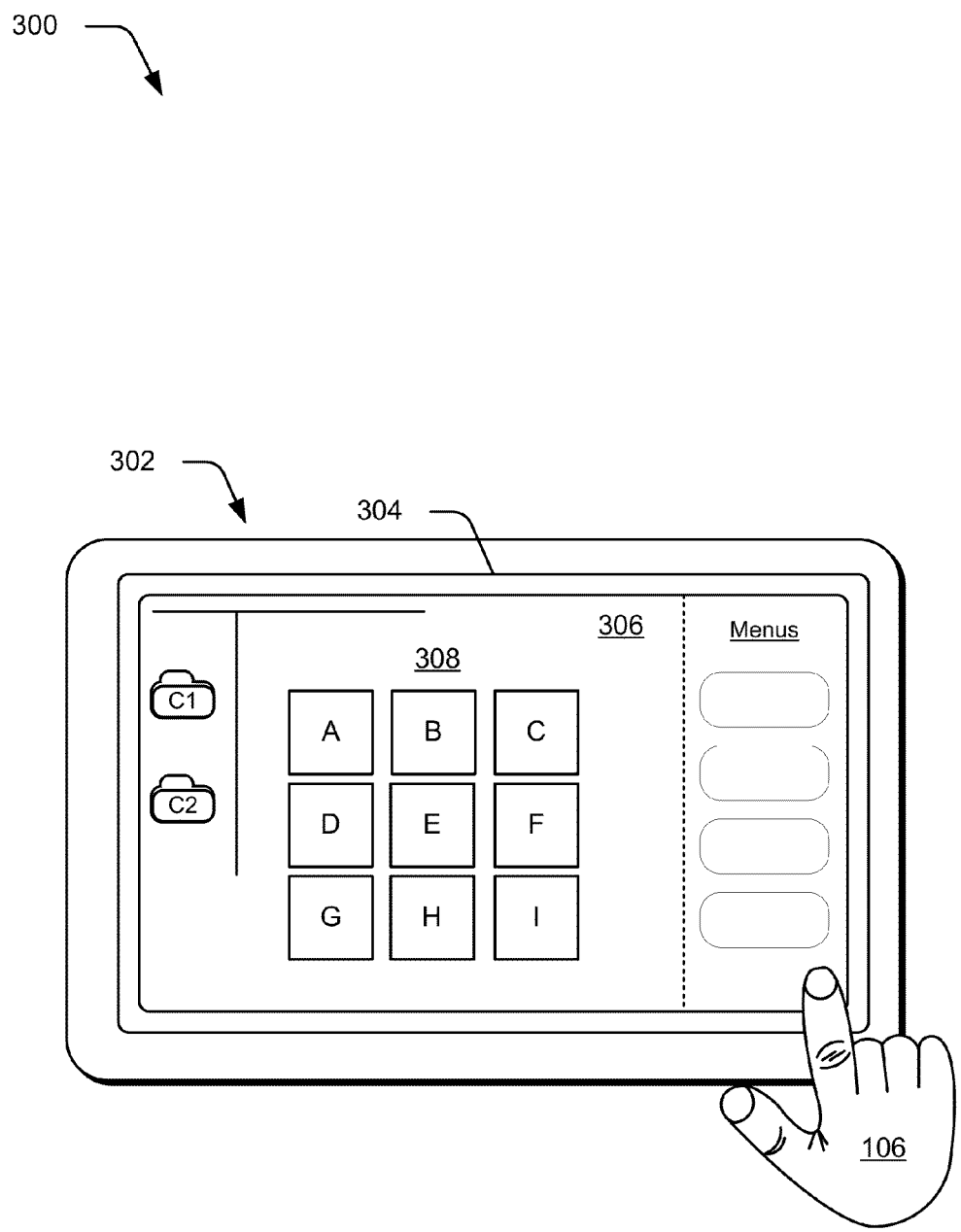
FIG. 3 illustrates an example computing device in accordance with one or more embodiments.

As an example, consider FIG. 3 which illustrates an environment 300 in accordance with one or more embodiments. Here, computing device 302 includes a display device 304 presenting an example user interface 306. The example user interface 306 displays an example collection 308 of items, in this case arranged in a three by three grid. The example collection 308 can be configured to enable a user to view, navigate, and work with groups of related items such as a photo library, documents, tiles representing applications, icons, a media collection, and so forth. Generally speaking, items within a collection are positioned at respective locations, such as locations defined by a row and column in the example grid. The items can also be considered to occupy respective dimensional footprints within the display of the collection 308 in the user interface 306. In the example collection 308 for instance, the items labeled "A" through "I" each have generally square dimensional footprints that are arranged in the grid at respective locations. In at least some embodiments, dimensional footprints for items establish individual areas to which visual transitions for rearrangement animations are bound and operate upon as discussed in greater detail below. Although generally uniform square items are illustrated for simplicity of the drawings, it is noted that items in collections can have various sizes and/or shapes for their footprints. Moreover, the items can be arranged in various ways including being arranged in a list, a grid as depicted, a carousel interface, a three-dimensional arrangement, and so forth.

Generally speaking, a rearrangement of the collection results in at least some of the items in the collection being moved to different respective positions within the collection. For instance, an item can be removed or added, the collection may be sorted, items can relocate and/or swap positions, and so forth. Input to cause these and other kinds of rearrangements can trigger rearrangement animations described herein to depict visually a change being made to the collection. Rather than depicting items moving directly along pathways between starting positions and ending positions, which can create jumbled intermediate views, in at least some embodiments, at least a portion of the spatial travel of items can be omitted. This can simplify the animation visually and minimize overlap of the items. Various different ways in which collection rearrangement animations can be implemented are described in relation to the following example animation sequences and methods.

Figure 4:
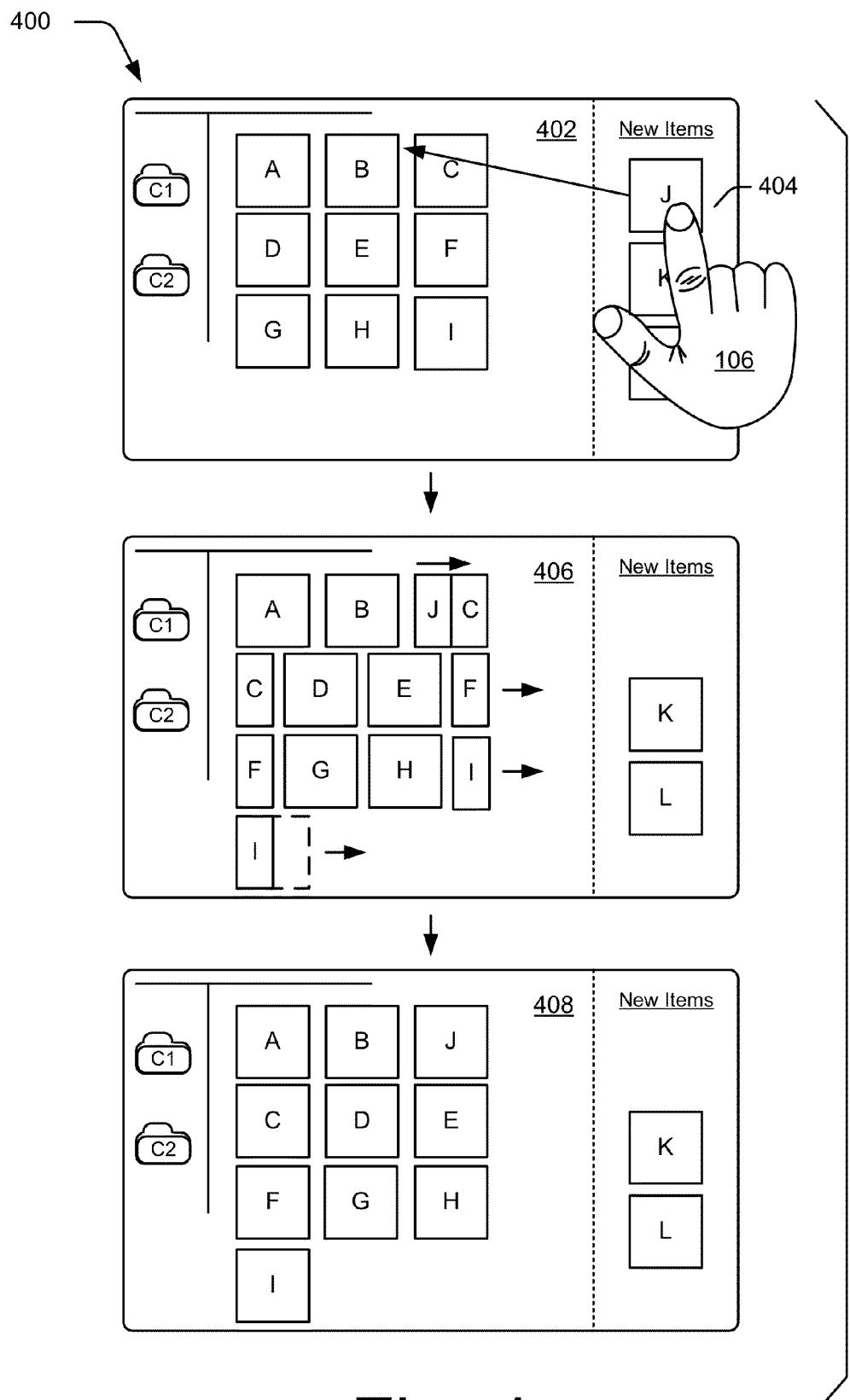
FIG. 4 illustrates an example animation sequence in accordance with one or more embodiments.

Consider FIG. 4 which illustrates an example animation sequence in accordance with one or more embodiments, generally at 400. In particular, the example animation sequence shows one way in which rearrangement of the collection 308 of FIG. 3 can be animated in response to addition of an item to the collection. Here, a user interface 402 shows user interaction 404 to add an item "J" to the collection. Through the interaction 404, the item "J" is selected to be added in the collection between items "B" and "C." In this case, the interaction is depicted as a gesture in which the user's hand 106 selects an item from a new items list or folder and drags the item to a position in the collection. Of course other kinds of input such as a mouse selection, keyboard input, menu selection, and so forth could also be employed to add an item.

As the animation sequence progresses visually downward in FIG. 4, addition of the item "J" triggers a rearrangement and corresponding animation as shown in the user interface 406. In this example, a cascading animation is applied to insert the item "J" in the collection. In particular, rearranged items are animated generally to slide out of initial positions to the right and slide into destination positions from the left. For instance, in the top row "J" slides in from the left to replace "C." As "C" slides out in the top row, "C" reappears at its destination in the second row and can slide into position in a similar fashion. Likewise "I" slides out of its initial position in the third row and reappears at its destination position on a newly added fourth row. The rearranged collection is shown in the example user interface 408. Note that the ordering of the collection, which was initially left to right and top to bottom, is preserved during the rearrangement with the exception of "J" being inserted. Further details regarding the example rearrangement of FIG. 4 are described in relation to the following example method.

Figure 5:
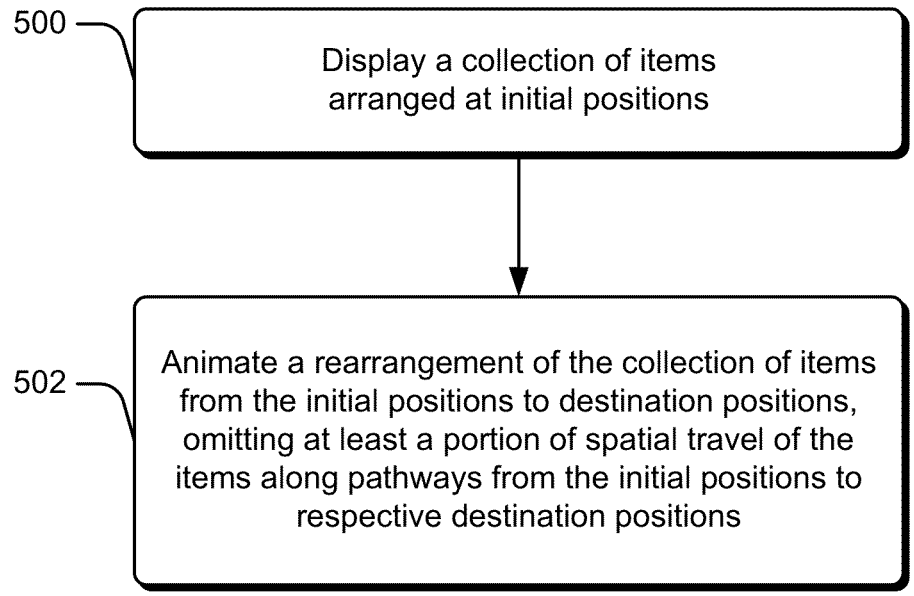
FIG. 5 is a flow diagram that describes steps in a method in accordance with one or more embodiments.

In particular, FIG. 5 is a flow diagram that describes steps in a method in accordance with one or more embodiments. The method can be performed in connection with any suitable hardware, software, firmware, or combination thereof. In at least some embodiments, the method can be performed by a suitably-configured animation module, such as the one described above.

Step 500 displays a collection of items arranged at initial positions. For example, a collection 308 as described and shown in relation to FIG. 3 can be displayed. User interaction with the collection can initiate a rearrangement of the collection. Step 502 animates a rearrangement of the collection of items from the initial positions to destination positions. The animation omits at least a portion of spatial travel of the items along pathways from the initial positions to respective destination positions.

For instance, in the example of FIG. 4, there is no overlap of items in the animation. Moreover, direct travel of at least some of the items to destination positions is not depicted. In effect, visual transitions are applied individually to different items to create the animation. Although left to right sliding is depicted, any suitable visual transitions can be used including, by way of example and not limitation, sliding, fading in/out, blending, fly-outs, checkerboards, and so forth. The use of various different kinds of visual transitions enables some or all of the spatial travel of items along pathways to be omitted while still visually indicating movement of items to different positions. Although, some movement of items along pathways can be depicted in an animation, the animated movement depicted is less than full travel of the items to reach destination positions.

In some embodiments, visual transitions applied to items are configured to show initial movement of each item as the items leave initial positions. The movement can occur up until a defined and/or configurable threshold of movement is reached. The threshold can be defined to control movements of items based on time and/or distance traveled. Thus, the movement threshold controls the amount of movement that is depicted when rearranged items leave initial positions and/or enter destination positions. When the movement threshold is reached as items leave initial positions, the items disappear and then reappear somewhere proximate to their respective destination locations. To complete the animation, the visual transitions are configured to show ending movement of each item to reach destination positions. The ending movement can also occur in accordance with a movement threshold. For instance, items can be made to reappear and ending movement can occur within a distance based movement threshold for the destination positions. Note that in this approach, the animation can be based solely on the initial and destination positions. It becomes unnecessary to define, track, show, or otherwise enumerate intermediate positions along pathways between the initial and destination positions. In other words the animation is configured to be independent of the pathways.

In at least some embodiments, visual transitions and effects can be bound to dimensional footprints of items within a collection. In other words, the visual transitions can be configured to operate proximate to (e.g., within or adjacent to) the footprints. For example, the transition from "J" to "C" in the preceding example of FIG. 4 occurs within respective dimensional footprints. In some cases, a visual transition can extend to a certain degree outside the dimensional footprint for items. For instance, a threshold of movement as discussed above can define an amount of movement that can occur beyond the dimensional footprint. Movement outside of a dimensional footprint can be shown until the threshold is reached at which point, the item disappears and reappears at its destination (e.g., the item "teleports" to its destination). Additional examples are provided in relation to the following figures.

Figure 6:
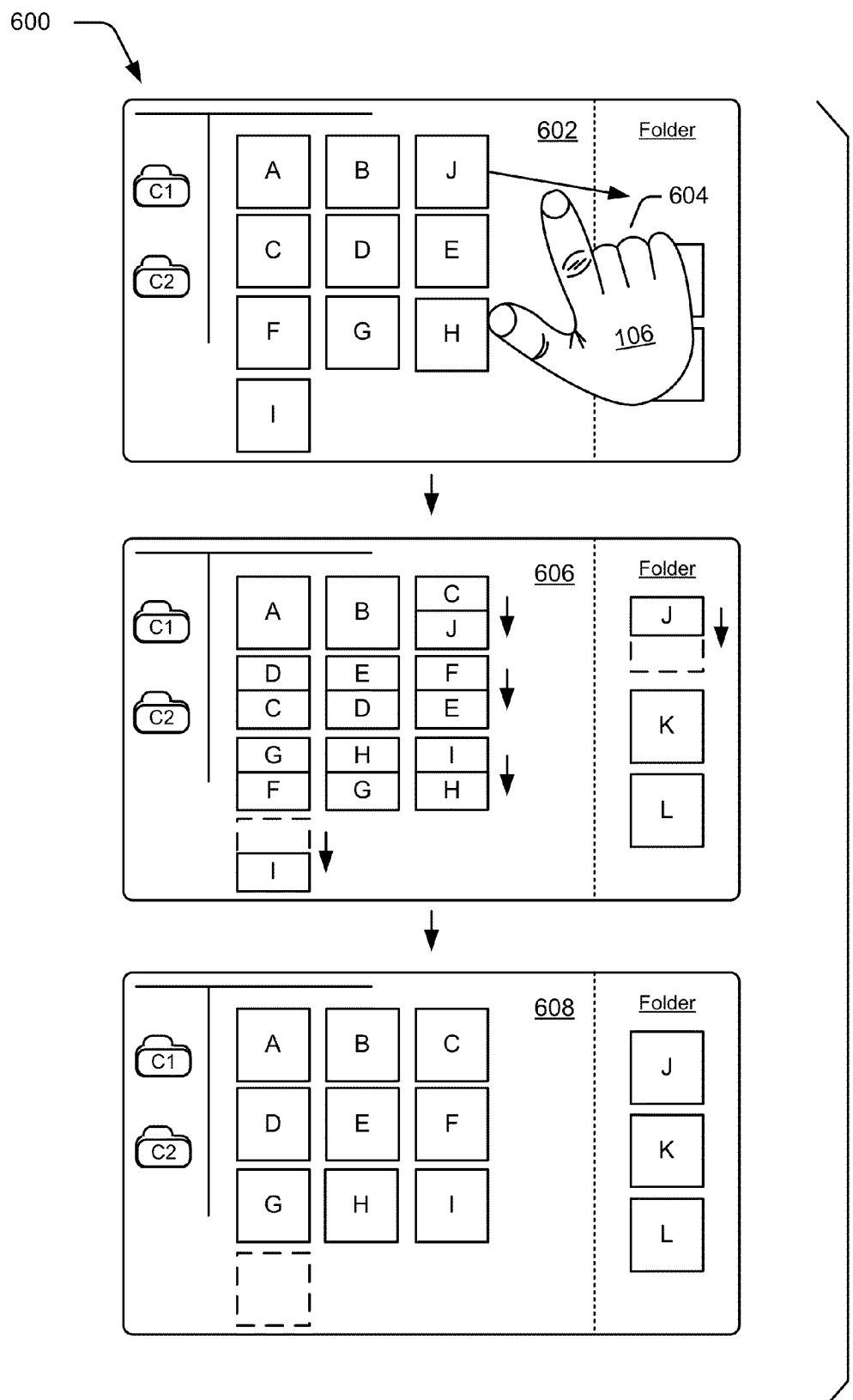
FIG. 6 illustrates another example animation sequence in accordance with one or more embodiments.

Consider FIG. 6 which illustrates another example animation sequence in accordance with one or more embodiments, generally at 600. In particular, the example animation sequence shows one way in which rearrangement of a collection can be animated in response to removal of an item to the collection. Here, a user interface 602 shows user interaction 604 to remove an item "J" from the collection. The item "J" is shown as being moved to an example folder that may represent another collection, a storage location, a trash bin, or so forth.

Removal of the item "J" triggers a rearrangement and corresponding animation as shown in the user interface 606. Although, an animation similar to the example animation of FIG. 4 could be employed, a different example is shown in FIG. 6. In this example, a visual transition is applied to each item that is being rearranged at respective positions in the collection. The visual transition can be applied individually to each item. Although the same visual transitions are illustrated for each item in the example, different transitions could be selected for and/or applied to different items on an individual basis. The visual transitions can be configured to provide any suitable visual effect to represent movement of one item out of and/or another item into a particular position in the collection. The visual transitions can be configured to show a visual transition between items with respect to a dimensional footprint, such as changing between images corresponding to two different application tiles represented by item "J" and item "C" that replaces item "J."

In particular, visual transitions are applied to remove the item "J" from the collection. In this example, the visual transitions are applied on an individual basis to each item that is repositioned in the rearrangement. Generally, the rearranged items are animated to show wiping of items at each position from top to bottom. In this example, note that the wiping transitions occur within respective dimensional footprints defined for the items. For instance, in the top row "C" wipes in from the top to replace "J". In a similar fashion in the second row, "D" wipes in from the top to replace "C," "E" replaces "D," "F" replaces "E," and so forth. As further illustrated, visual transitions can be applied across folders and/or collections as is the case for animating item "J" being added into the example folder. In another example, part of the wiping could extend outside of dimensional footprints, such as showing items initially push in from the top and exit out the bottom with some animation of movement across boundaries of the dimensional footprints.

The rearranged collection is shown in the example user interface 608. As illustrated, the rearrangement has caused item "J" to be relocated from the collection to the folder on the side, items have rearranged in the collection, and the position initially occupied by item "I" is now empty and/or hidden since the collection has one fewer item after item "J" is removed.

Figure 7:
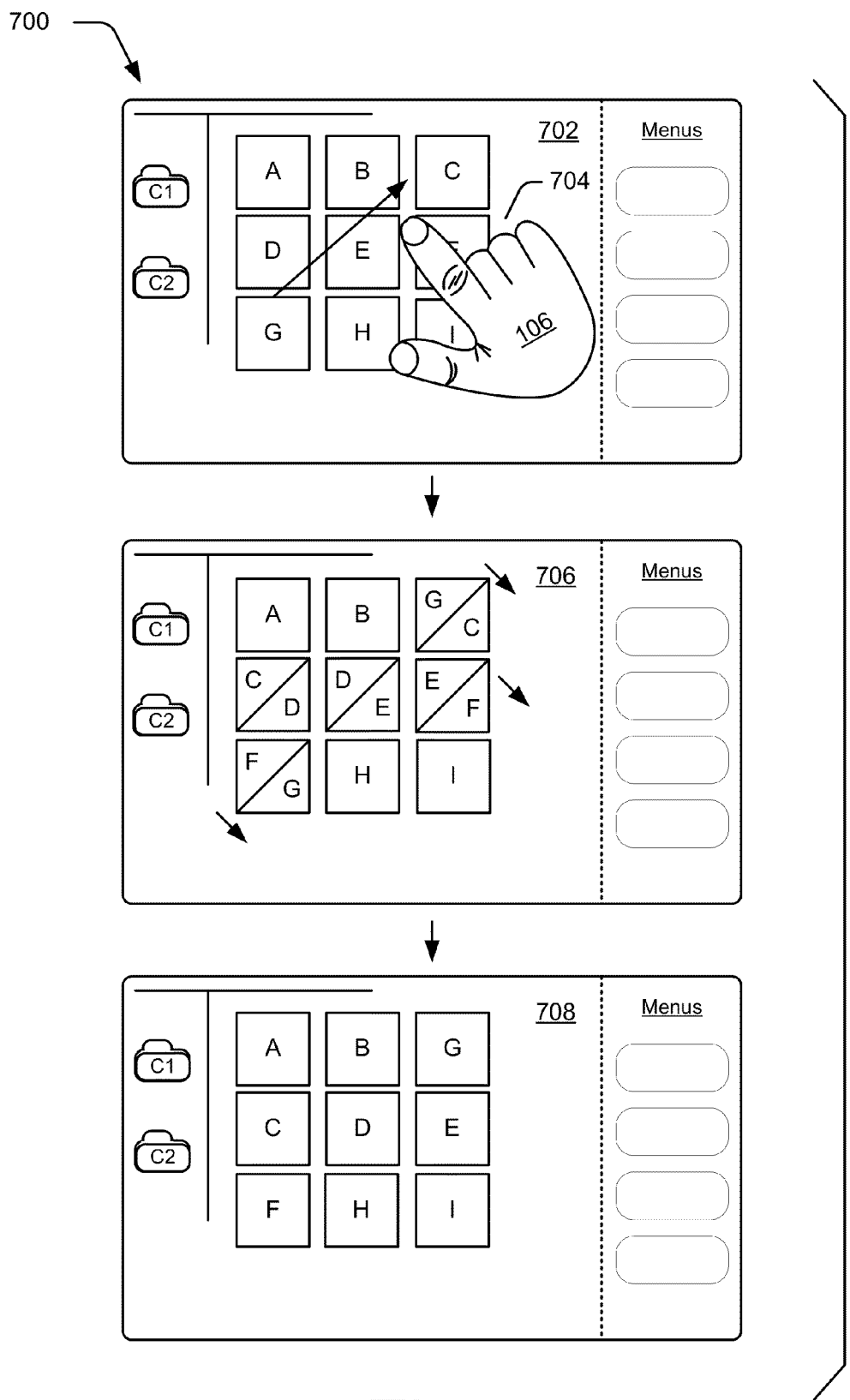
FIG. 7 illustrates another example animation sequence in accordance with one or more embodiments.

FIG. 7 illustrates another example animation sequence in accordance with one or more embodiments, generally at 700. Here, a user interface 702 shows user interaction 704 to relocate an item "G" within the collection. The item "G" is shown as being moved to the position initially occupied by item "C".

Relocation of the item "G" triggers a rearrangement and corresponding animation as shown in the user interface 706. This rearrangement is similar to those previously described and animations similar to the example animations of FIG. 4 or FIG. 6 can be employed. In FIG. 7, though, another example visual transition is depicted for the animation. In particular, the rearranged items are animated to show wiping of items diagonally from top to bottom. Again, the visual transitions are applied on an individual basis to each item that is repositioned in the rearrangement. The rearranged collection is shown in the example user interface 708. The example animation sequence shown in FIG. 7 can occur as described in relation to the example animation sequence of FIG. 6 with the exception of different visual transitions being used in the two examples.

Figure 8:
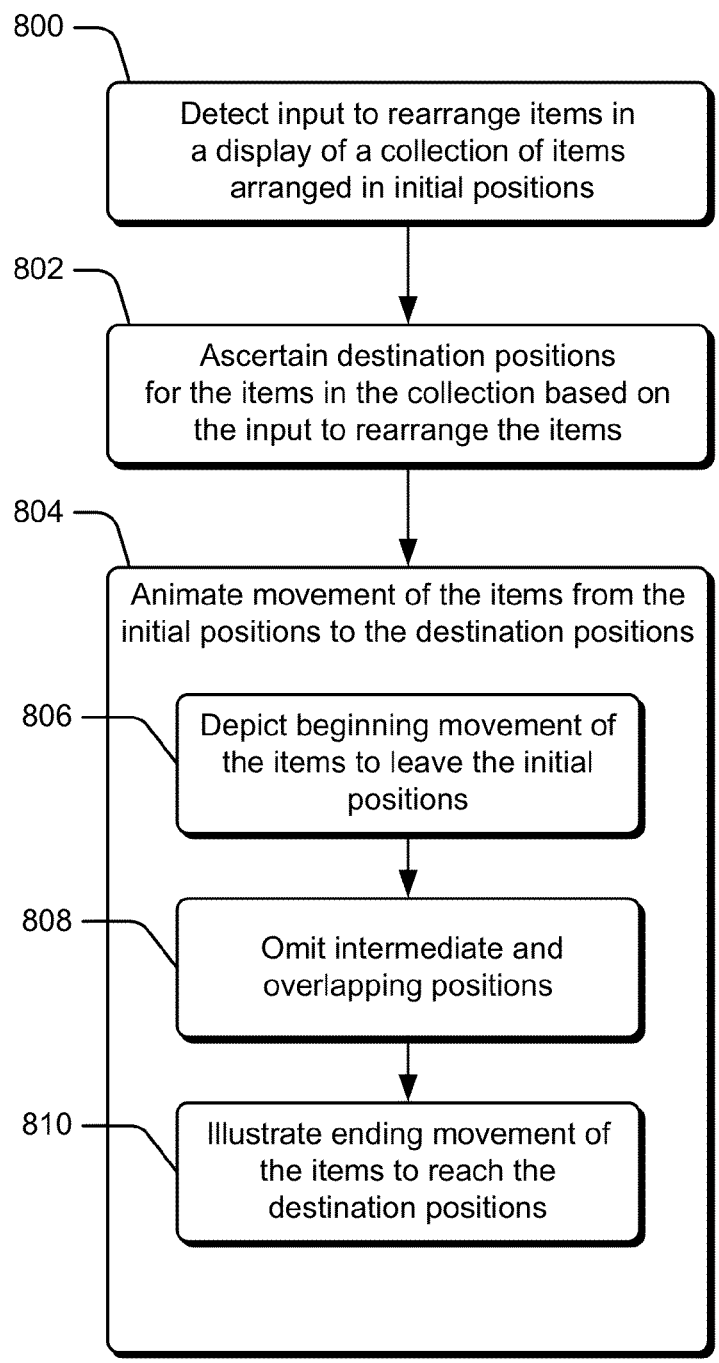
FIG. 8 is a flow diagram that describes steps of another method in accordance with one or more embodiments.

FIG. 8 is a flow diagram that describes steps in a method in accordance with one or more embodiments. The method can be performed in connection with any suitable hardware, software, firmware, or combination thereof. In at least some embodiments, the method can be performed by a suitably-configured animation module, such as the one described above.

Step 800 detects input to rearrange items in a display of a collection of items arranged in initial positions. Step 802 ascertains destination positions for the items in the collection based on the input to rearrange the items. For example, the animation module 103 can detect various different gestures and/or other inputs that cause a collection rearrangement as discussed herein. The animation module 103 can then calculate where each item will appear in the rearranged view based on the detected input.

Step 804 animates movement of the items from the initial positions to the destination positions. The animation can be produced using the initial and destination positions without enumerating intermediate positions. Thus, the animation is independent of travel pathways for the items. For instance, the animation module 103 can select and/or apply an animation to represent the movement. Different animations can be used for different kinds of rearrangements. For example, different animations can be associated with sorting, adding, removing, and/or other different rearrangements. Thus, the animation module 103 can select and apply an appropriate animation based upon the detected input and/or a corresponding kind of rearrangement.

To animate the movement, step 806 depicts beginning movement of the items to leave the initial positions. Various kinds of transitions/effects discussed herein can be used to show beginning movement. Step 808 omits intermediate and overlapping positions. Effectively, the animation module can cause items to disappear and reappear proximate to (e.g., at or near) their destination positions. Thus, depiction of travel along pathways from the initial positions to the destination positions can be partially or completely eliminated. Step 810 illustrates ending movement of the items to reach the destination positions. Again, various kinds of transitions/effects discussed herein can be used to show the ending movement. It should be noted that the same or different transitions/effects can be used for beginning movement and ending movements respectively. Moreover, different transitions/effects can be applied on an individual basis to different items, positions, and/or footprints. Further examples of how this can be done are provided above and below.

Figure 9:
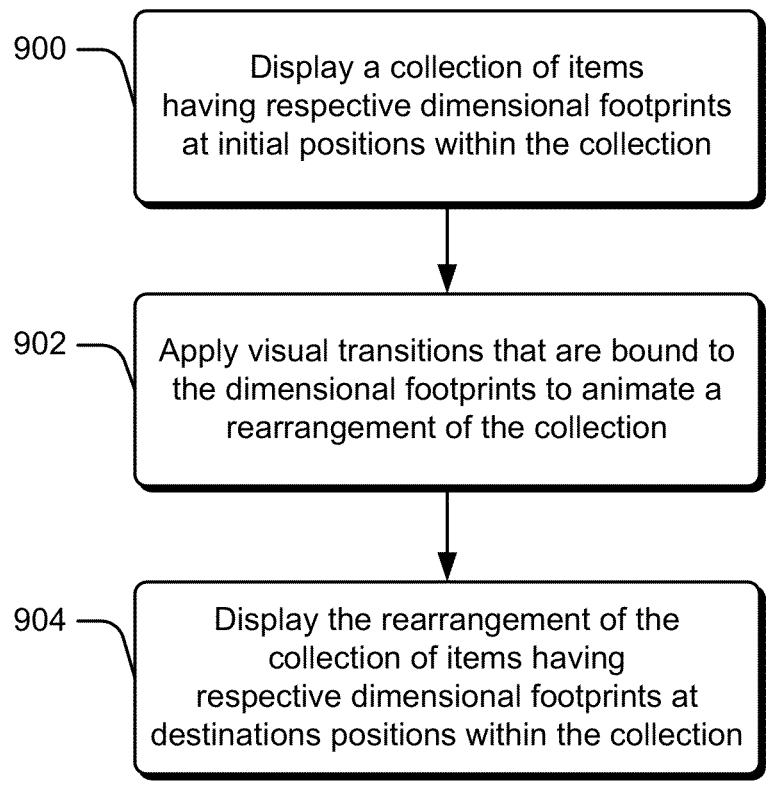
FIG. 9 is a flow diagram that describes steps of another method in accordance with one or more embodiments.

FIG. 9 is a flow diagram that describes steps in a method in accordance with one or more embodiments. The method can be performed in connection with any suitable hardware, software, firmware, or combination thereof. In at least some embodiments, the method can be performed by a suitably-configured animation module, such as the one described above.

Step 900 displays a collection of items having respective dimensional footprints at initial positions within the collection. As noted previously, items in a collection can be considered to occupy respective dimensional footprints, such as the generally square dimensional footprints of the preceding examples. Various collections can be output for display on a computing device 102 to enable a user to view, navigate, and interact with the collection.

Step 902 applies visual transitions that are bound to the dimensional footprints to animate a rearrangement of the collection. In response to user interaction that initiates a rearrangement (e.g., sorting, addition, relocation, and/or removal of items), an animation module 103 can operate to implement visual transitions to animate the rearrangement. The visual transitions are bound to the dimensional footprints of items upon which they operate. In other words, the visual transitions are designed to operate within or adjacent to respective dimensional footprints of items to which they are applied. In some embodiments, the visual transitions are confined within the dimensional footprints. Thus, an effect applied to switch between two different pictures of a collection can operate within the dimensional footprints of one or more items. In another approach, visual transitions can extend at least somewhat outside of the dimensional footprints, such as to show some movement of items to and from different positions in the collection.

Step 904 displays the rearrangement of the items having respective dimensional footprints at destination positions within the collection. For instance, items can be animated leaving the initial positions. After initial movement is shown, items can disappear and reappear at destination positions. In other words, the items teleport to their destinations and intermediate movement along pathways is not shown. At the destination positions, items are animated entering the destination positions. Thus, visual transitions can be applied that generally operate proximate to the dimensional footprints of items and enable animations that omit at least a portion of travel along pathways from initial positions to destination positions. Further examples of how this can be done are provided above and below.

Figure 10:
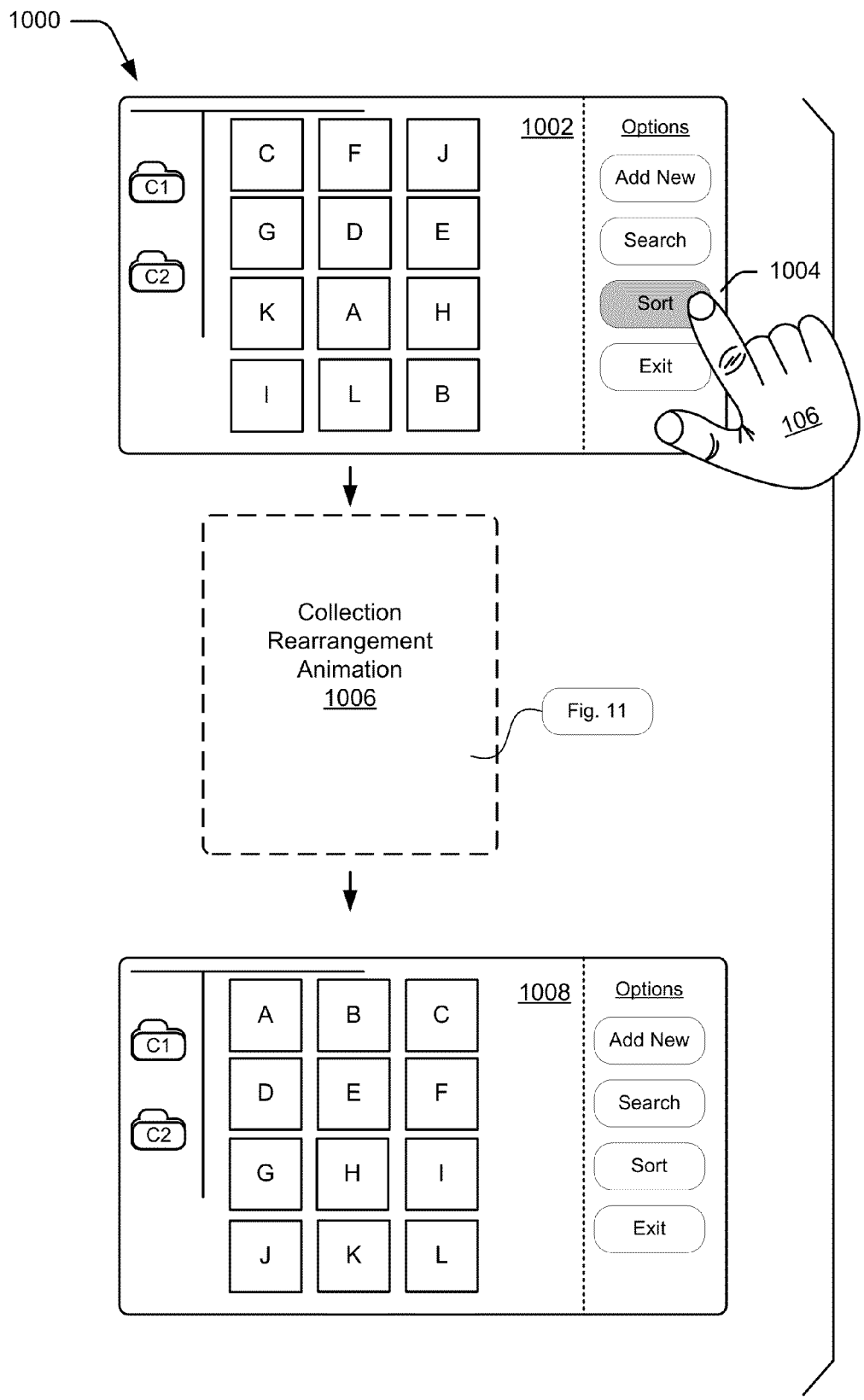
FIG. 10 illustrates another example animation sequence in accordance with one or more embodiments.

To further illustrate, consider FIG. 10 which illustrates another example animation sequence in accordance with one or more embodiments, generally at 1000. In particular, the example animation sequence shows one way in which rearrangement of a collection can be animated in response to a sort operation. In the case of sorting and similar operations, changes to a collection can be drastic since many items and even all the items of a collection may be relocated. Visually representing this kind of a change using traditional direct pathways can be computationally expensive and produce jumbled intermediate views. Collection rearrangement animation techniques described herein though can be applied to predictably choreograph sorting animations.

Here, a user interface 1002 shows user interaction 1004 to initiate a sort operation. In this case, the interaction is depicted as a gesture in which the user's hand 106 selects a sort option from a menu that can be exposed by the user interface. Of course other kinds of input such as a sorting gesture, mouse selection, keyboard input, menu selection, and so forth could also be employed to cause a sort. Collections can be sorted in various ways. For instance, items can be sorted alphabetically, by date, size, and so forth. Different collection specific categories can also be used to sort items. For instance, sorting can be performed using categories such as author, artist, and/or genre for a media collection of books, music, and/or videos.

In the illustrated example, the interaction 1004 is configured to sort the items in alphabetical order. The sort operation causes the items to be rearranged and triggers a corresponding collection rearrangement animation 1006, details of which are described in relation to an example shown in FIG. 11. The rearranged collection that results from the collection rearrangement animation 1006 is shown in the example user interface 1008. Notice that the items in the user interface 1008 are arranged alphabetically based on the sort.

Figure 11:
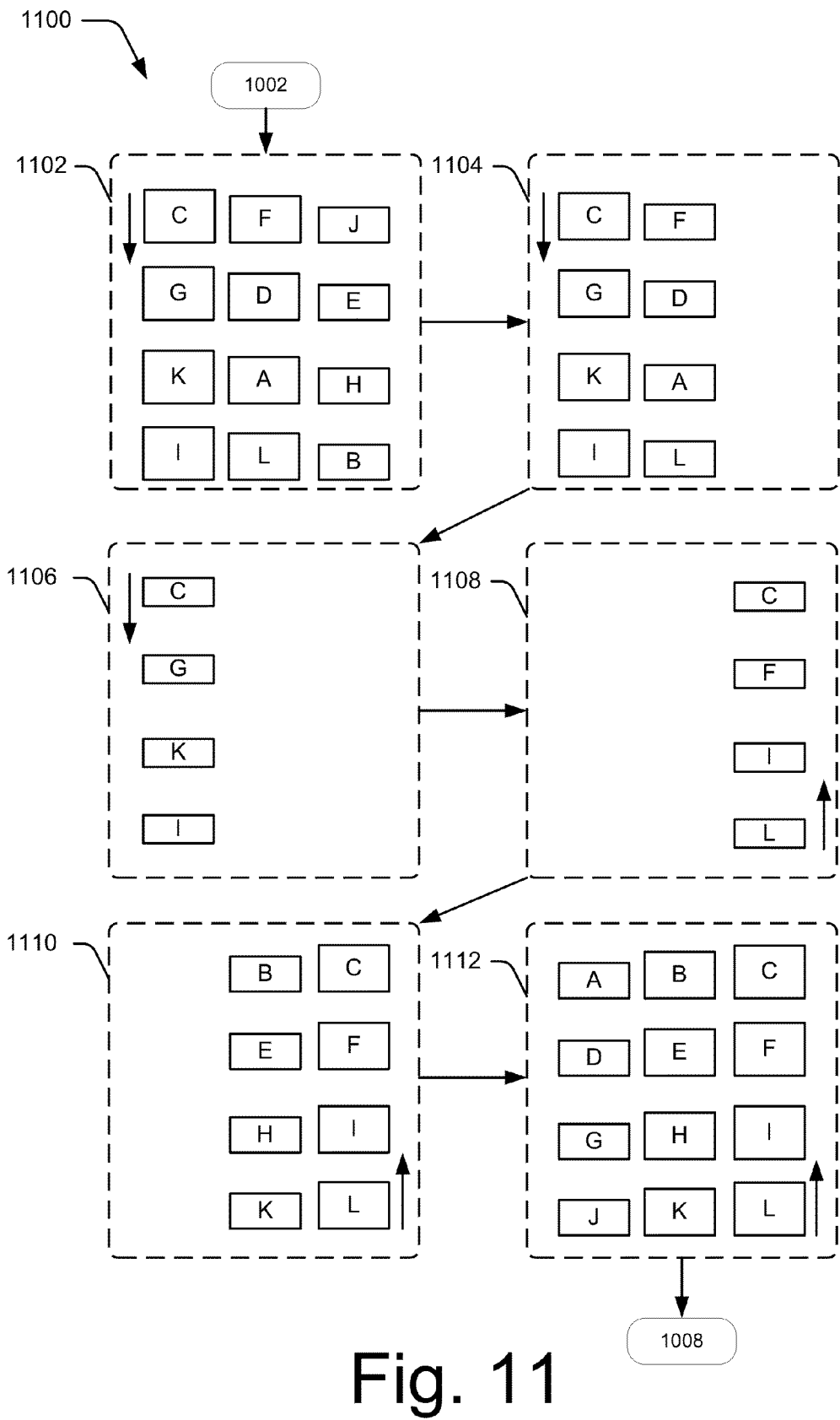
FIG. 11 illustrates an example sorting animation that can be employed for the animation sequence of FIG. 10 in accordance with one or more embodiments.

Referring to FIG. 11, an example sorting animation that can be employed for the animation sequence of FIG. 10 in accordance with one or more embodiments is depicted as generally at 1100. In particular, an example choreographed animation is shown in which a staggered reduction of items occurs down the columns of the collection. The animation is represented in FIG. 11 using selected frames (but not all of the frames) that can be involved in the animation. The staggered reduction of items occurs beginning at example frame 1102. Here reduction in size of each of the items is depicted with the amount of reduction being staggered for different columns. Individual items gradually continue to reduce in size and can disappear as shown by the progression from frame 1102 to frame 1104 and on to frame 1106. Between frame 1106 and frame 1108, the collection can be empty or hidden completely for a brief period of time. Then, at frame 1108 items begin to reappear at respective destination positions. In this example, the reappearance is again staggered in a comparable way. Individual items gradually continue to expand in size as shown by the progression from frame 1108 to frame 1110 and on to frame 1112.

Here again movement of the items can occur such that the beginning and ending movement is depicted, but intermediate positions on paths across the collection are omitted. Items can be "teleported" by hiding the items and causing the items to reappear at or near respective destination positions. Additionally, visual transitions are applied to each item of the collection. These visual transitions are bound to respective dimensional footprints such that the visual effects for each item/position occur within or adjacent to the dimensional footprints.

Generally, items being removed from initial positions can be visually diminished at the initial positions. This can occur by reducing the physical dimensions of the item (e.g., clipping, squeezing, contracting, compacting), fading out, transparency effects, movement away from the positions, and/or combinations thereof. At destination positions, arriving items can be made visually more prominent by increasing the physical dimensions of the item (e.g., expanding, stretching), fading in, transparency effects, movement toward the positions, and/or combinations thereof. Various suitable visual transitions can be applied to implement the animation in this manner, of which the depicted animation is but one example.

Example Device

Figure 12:
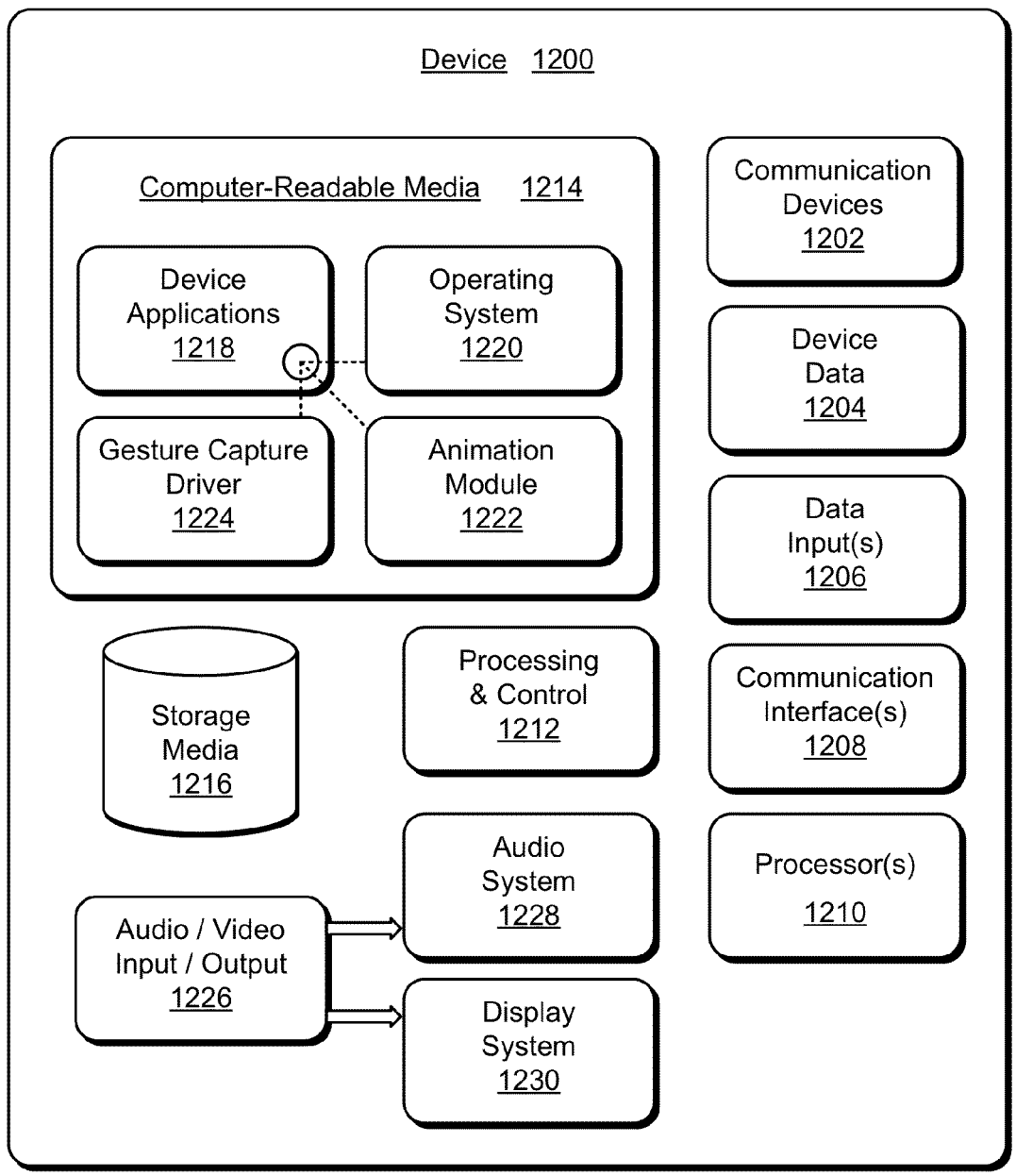
FIG. 12 illustrates an example computing device that can be utilized to implement various embodiments described herein.

FIG. 12 illustrates various components of an example device 1200 that can be implemented as any type of portable and/or computing device as described with reference to FIGS. 1 and 2 to implement embodiments of the collection rearrangement animation techniques described herein. Device 1200 includes communication devices 1202 that enable wired and/or wireless communication of device data 1204 (e.g., received data, data that is being received, data scheduled for broadcast, data packets of the data, etc.). The device data 1204 or other device content can include configuration settings of the device, media content stored on the device, and/or information associated with a user of the device. Media content stored on device 1200 can include any type of audio, video, and/or image data. Device 1200 includes one or more data inputs 1206 via which any type of data, media content, and/or inputs can be received, such as user-selectable inputs, messages, music, television media content, recorded video content, and any other type of audio, video, and/or image data received from any content and/or data source.

Device 1200 also includes communication interfaces 1208 that can be implemented as any one or more of a serial and/or parallel interface, a wireless interface, any type of network interface, a modem, and as any other type of communication interface. The communication interfaces 1208 provide a connection and/or communication links between device 1200 and a communication network by which other electronic, computing, and communication devices communicate data with device 1200.

Device 1200 includes one or more processors 1210 (e.g., any of microprocessors, controllers, and the like) which process various computer-executable or readable instructions to control the operation of device 1200 and to implement the gesture embodiments described above. Alternatively or in addition, device 1200 can be implemented with any one or combination of hardware, firmware, or fixed logic circuitry that is implemented in connection with processing and control circuits which are generally identified at 1212. Although not shown, device 1200 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1200 also includes computer-readable media 1214 that may be configured to maintain instructions that cause the device, and more particularly hardware of the device to perform operations. Thus, the instructions function to configure the hardware to perform the operations and in this way result in transformation of the hardware to perform functions. The instructions may be provided by the computer-readable media to a computing device through a variety of different configurations.

One such configuration of a computer-readable media is signal bearing media and thus is configured to transmit the instructions (e.g., as a carrier wave) to the hardware of the computing device, such as via a network. The computer-readable media may also be configured as computer-readable storage media and thus is not a signal bearing medium. Computer-readable storage media for the device 1200 can include one or more memory components, examples of which include fixed logic hardware devices, random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1200 can also include a mass storage media device 1216.

Computer-readable media 1214 provides data storage mechanisms to store the device data 1204, as well as various device applications 1218 and any other types of information and/or data related to operational aspects of device 1200. For example, an operating system 1220 can be maintained as a computer application with the computer-readable media 1214 and executed on processors 1210. The device applications 1218 can include a device manager (e.g., a control application, software application, signal processing and control module, code that is native to a particular device, a hardware abstraction layer for a particular device, etc.). The device applications 1218 also include any system components or modules to implement embodiments of the techniques described herein. In this example, the device applications 1218 include an animation module 1222 and a gesture-capture driver 1224 that are shown as software modules and/or computer applications. The animation module 1222 can be implemented to provide various collection rearrangement animations examples of which have been described herein. The gesture-capture driver 1224 is representative of software that is used to provide an interface with a device configured to capture a gesture, such as a touchscreen, track pad, camera, and so on. Alternatively or in addition, the animation module 1222 and the gesture-capture driver 1224 can be implemented as hardware, fixed logic device, software, firmware, or any combination thereof.

Device 1200 also includes an audio and/or video input-output system 1226 that provides audio data to an audio system 1228 and/or provides video data to a display system 1230. The audio system 1228 and/or the display system 1230 can include any devices that process, display, and/or otherwise render audio, video, and image data. Video signals and audio signals can be communicated from device 1200 to an audio device and/or to a display device via an RF (radio frequency) link, S-video link, composite video link, component video link, DVI (digital video interface), analog audio connection, or other similar communication link. In an embodiment, the audio system 1228 and/or the display system 1230 are implemented as external components to device 1200. Alternatively, the audio system 1228 and/or the display system 1230 are implemented as integrated components of example device 1200.

CONCLUSION

Collection rearrangement animation techniques have been described herein. The techniques can be used to depict animations for rearrangement of a collection of items that omit at least a portion of the spatial travel of items along pathways from the initial positions to destination positions in the rearranged collection. For instance, items can be animated to disappear from the initial positions and reappear at destination positions (e.g., teleport). This can occur by applying visual transitions that are bound to dimensional footprints of the items in the collection and/or by omitting at least some intermediate and overlapping positions.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method comprising:
    displaying a collection of items arranged at initial positions, the items occupying respective dimensional footprints within the collection; and
    animating a rearrangement of the collection of items from respective initial positions to respective destination positions with an animation that omits a portion of spatial travel of rearranged items along pathways from the respective initial positions to the respective destination positions by depicting initial movement of the rearranged items away from the respective initial positions, causing the rearranged items to disappear and reappear near the respective destination positions, and illustrating ending movement of the rearranged items to reach the respective destination positions, the animating the arrangement further comprising applying visual transitions that are bound to the respective dimensional footprints such that movement of the rearranged items away from the respective dimensional footprints at the initial positions and into the respective dimensional footprints at the destination positions are shown simultaneously until a distance threshold is reached, at which point the rearranged items disappear and reappear at or near the respective destination positions.

2. The computer-implemented method of claim 1, wherein animating the rearrangement comprises applying visual transitions individually to at least some of the items.

3. The computer-implemented method of claim 1, wherein the animation omits overlap of the items.

4. The computer-implemented method of claim 1, further comprising detecting input to cause the rearrangement and ascertaining the destination positions based on the detected input.

5. The computer-implemented method of claim 1, wherein animating the rearrangement comprises depicting spatial travel of items along the pathways that is less than full travel of the items to reach the destination positions.

6. The computer-implemented method of claim 1, wherein animating the rearrangement comprises producing the animation based on the initial positions and the destination positions without enumeration of intermediate positions for the items.

7. The computer-implemented method of claim 1, wherein the rearrangement is initiated to change the collection by one or more of adding an item, removing an item, relocating an item, or sorting the collection.

8. The computer-implemented method of claim 1, further comprising detecting a gesture to cause the rearrangement and performing the animating in response to the detected gesture.

9. A system comprising:
    at least a memory and a processor to implement an animation module, the animation module configured to perform operations comprising:
        detecting input to rearrange items in a display of a collection of items arranged in initial positions, the items occupying respective dimensional footprints within the collection; ascertaining destination positions for the items in the collection based on the input to rearrange the items; and
        animating a rearrangement of the items from respective initial positions to respective destination positions to produce an animation that is independent of travel pathways between the respective initial positions and the respective destination positions by depicting beginning movement of the rearranged items to leave the initial positions, omitting intermediate and overlapping positions, and illustrating ending movement of the rearranged items to reach the destination positions, the animating the rearrangement further comprising applying visual transitions that are bound to the respective dimensional footprints such that movement of the rearranged items away from the respective dimensional footprints at the initial positions and into the respective dimensional footprints at the destination positions are shown simultaneously until a distance threshold is reached, at which point the rearranged items disappear and reappear at or near the respective destination positions.

10. The system of claim 9, wherein detecting input comprises detecting a gesture input via a touchscreen of the computing device.

11. The system of claim 9, wherein the animating movement comprises applying visual transitions individually to at least some of the items.

12. The system of claim 9, wherein the input to rearrange items comprises input to change the collection by one or more of adding an item, removing an item, relocating an item, or sorting the collection.

13. The system of claim 9, wherein the visual transitions are applied to each item to implement a choreographed animation.

14. A computer-implemented method comprising:
    displaying a collection of items having respective dimensional footprints within the collection;
    applying visual transitions that are bound to the respective dimensional footprints to animate a rearrangement of the collection of items; and
    displaying the rearrangement of the collection of items having respective dimensional footprints at destination positions within the collection, wherein the visual transitions operate proximate to the dimensional footprints of items at the initial positions to cause the rearranged items to disappear and reappear at or near the destination positions without depicting intermediate travel of the items along pathways from the initial positions to the destination positions, the visual transitions bound to the respective dimensional footprints such that movement of the rearranged items away from the respective dimensional footprints at the initial positions and into the respective dimensional footprints at the destination positions are shown simultaneously until a distance threshold is reached, at which point the rearranged items disappear and reappear at or near the respective destination positions.

15. The computer-implemented method of claim 14, wherein the visual transitions are configured to operate within or adjacent to respective dimensional footprints of items to which the visual transitions are applied.

16. The computer-implemented method of claim 14, wherein the rearrangement comprises sorting of the collection of the items and the visual transitions are applied to each item to implement a choreographed animation that represents the sorting.

17. The computer-implemented method of claim 14, wherein the visual transitions are configured to cause items to visually diminish at respective initial positions and become visually prominent at respective destination positions.

18. The computer-implemented method of claim 14, further comprising detecting input to cause the rearrangement of the collection of items and ascertaining the destination positions based on the detected input.

19. The computer-implemented method of claim 18, wherein the input comprises input to rearrange the collection of items by one or more of adding an item, removing an item, relocating an item, or sorting the collection.

20. The computer implemented method of claim 14, wherein the applying the visual transitions comprises applying visual transitions individually to at least some of the items.

\* \* \* \* \*